United States Patent [19]

Osada et al.

[11] Patent Number: 5,182,324

[45] Date of Patent: Jan. 26, 1993

[54] ALCOHOLIC MARKING INK COMPOSITION

[75] Inventors: Takahiro Osada; Yoko Aoki, both of Gunma, Japan

[73] Assignee: Mitsubishi Pencil Kabushiki Kaisha, Tokyo, Japan

[21] Appl. No.: 808,438

[22] Filed: Dec. 16, 1991

[30] Foreign Application Priority Data

Jan. 11, 1991 [JP] Japan .................................. 3-012504

[51] Int. Cl.$^5$ ............................................... C08K 5/05
[52] U.S. Cl. ................................... 524/379; 524/378; 524/389; 524/391
[58] Field of Search ................. 524/379, 378, 389, 391

[56] References Cited

U.S. PATENT DOCUMENTS

| | | | |
|---|---|---|---|
| 1,633,337 | 7/1925 | Lauter | 524/391 |
| 2,600,100 | 9/1946 | Evans et al. | 524/391 |
| 3,652,469 | 3/1972 | Glaser et al. | 524/391 |
| 4,740,549 | 4/1988 | Okuzono et al. | 524/379 |

FOREIGN PATENT DOCUMENTS 2209623 7/1974 France ................................ 524/391
1-30873 6/1989 Japan .

OTHER PUBLICATIONS

BASF, Technical Information, Laropal A 101, May 1985.
BASF, Technical Information, Laropal A 81, Feb. 1983.

*Primary Examiner*—Paul R. Michl
*Assistant Examiner*—Olga Asinovsky
*Attorney, Agent, or Firm*—Darby & Darby

[57] ABSTRACT

An alcoholic marking ink composition comprises a coloring agent, a solvent mainly composed of ethanol, a condensation product of urea and aliphatic aldehydes as a resin to be added, and a cationic surface active agent.

6 Claims, No Drawings

ALCOHOLIC MARKING INK COMPOSITION

BACKGROUND OF THE INVENTION

1. Field of the Invention

The present invention relates to an ink composition for alcoholic marking pens.

2. Description of the Prior Art

Heretofore, oil based marking pens often called "sign pens" or "felt pens" have been using xylenes, cellosolve or ketones as a main solvent for the ink. Therefore, there are problems such as the undesirable odor and toxicity to man and there is a possibility that methods of using such solvents and environment where such solvents are used may be limited.

These solvents solve the surface of a material on which writing is made with the marking ink, due to their solving property. Therefore, the writing characteristics required for the marker are problematic when the marker is used for writing on widely used materials.

Japanese Patent Application Laid-open No. 128404/1978 discloses an ink composition where a fluorine type surface active agent is added to an oil based ink composition so as to impart water resistance and oil resistance to the written images. However, this ink composition is concerned with an oil based ink which has problems adversely affecting man such as odor, toxicity and the like.

There is not known any ink composition comprising a solvent mainly composed of an alcohol to which the above-mentioned technique is applied.

In order to eliminate those disadvantages, ink compositions comprising ethanol as a substitute for oils have been investigated, but since the resins added for imparting fixability are soluble in ethanol and have affinity to both water and oil and fat to some extent due to the molecular structure of the resins, both water resistance and oil resistance of the ink composition become poor.

SUMMARY OF THE INVENTION

An object of the present invention is to provide an alcoholic marking ink composition usable for writing on the surface of various materials.

Another object of the present invention is to provide an alcoholic marking ink composition having an excellent written image fixability to a non-absorbing surface.

A further object of the present invention is to provide an alcoholic marking ink composition having excellent water resistance and excellent oil resistance of written images though an alcoholic solvent is used.

Still another object of the present invention is to provide an alcoholic marking ink composition substantially free from odor.

A still further object of the present invention is to provide an alcoholic marking ink composition of less toxicity.

According to the present invention, there is provided an alcoholic marking ink composition comprising a coloring agent, a solvent mainly composed of ethanol, a condensation product of urea and aliphatic aldehydes, as a resin to be added, and a cationic surface active agent.

DESCRIPTION OF THE PREFERRED EMBODIMENTS

The coloring agents used in the present invention are dissolved or dispersed in a solvent mainly composed of ethanol. The coloring agents may be dyes and pigments usually used for writing instruments and inks for coating.

Exemplary suitable dyes are basic dyes, acid dyes, direct dyes and the like.

As pigments, there may be used inorganic pigments and organic pigments. Exemplary suitable inorganic pigments are titanium oxide, iron black, red iron oxide and the like. Exemplary suitable organic pigments are azo type pigments, phthalocyanine type pigments, anthraquinone type pigments, indigo type pigments and the like.

As dyes, solubilized dyes and dyes enclosed in microcapsules may be also used, and as pigments, there may be used in the form of a dispersed mill base comprising a pigment of which the surface is modified with a resin or surface active agent.

The amount of coloring agents to be added is not particularly critical, and may be an amount determined depending on the solubility or dispersion property of the coloring agent, desired hue and color density. The range of the amount may be wide and is usually 0.1–50 % by weight based on the total ink composition.

The solvent used in the present invention is mainly composed of ethanol which is less toxic and is of quickdrying. The total amount of the solvent is preferably 40–95% by weight based on the total ink composition. The amount of ethanol is preferably 80% by weight or more based on the total amount of the solvent. Other solvent may be added to ethanol as an anxiliary solvent for various purposes.

As an auxilary solvent for dye, a whitening preventing agent or a dispersion auxiliary solvent, there may be used isopropyl alcohol, benzyl alcohol and the like. As an agent for preventing a pen point from drying, there may be used ethylene glycol, propylene glycol and the like.

The total amount of solvents other than ethanol is preferably 20% by weight or less based on the total amount of the solvent.

The condensation product of urea and aliphatic aldehydes is used in the present invention so as to improve the fixability of written images such as written lines and the like.

Exemplary suitable condensation products of urea and aliphatic aldehydes are Laropal A81 (trade name, supplied by BASF) and Laropal A101 (trade name, supplied by BASF).

The molecular weight and amount to be added of the condensation product are not particularly critical as far as the molecular weight and amount are suitable for the required fixing power and ink viscosity. The amount to be add is preferably 5–30% by weight based on the total ink composition. If desired, other resins, plasticizers and the like may be added to the condensation product of urea and aliphatic aldehydes.

As the cationic surface active agent, there may be preferably used perfluoroalkyl quaternary ammonium salt. The cationic surface active agent can improve water resistance and oil resistance of the ink composition when used together with the above-mentioned condensation product of urea and aliphatic aldehydes.

Exemplary suitable cationic surface active agents include alkyl amine acetate, alkyl dimethylamine oxide, alkyl picoline chloride, alkyl betaine, alkyl dimethylbenzyl ammonium salt, stearyl trimethyl ammonium salt, and perfluoroalkyl quaternary ammonium salt.

The amount of the cationic surface active agent to be added is usually 0.01–3.0% by weight based on the total ink composition. When the amount is less than 0.01% by weight, the effect is decreased. When the amount is more than 3.0% by weight, sometimes the written lines are repelled.

The interaction between the condensation product of urea and aliphatic aldehydes and the cationic surface active agent is one of the most important points.

The alcoholic marking ink composition according to the present invention can be applied to a surface of various materials such as, for example, papers, resins, metals and the like. In particular, it can be applied to even a non-absorbing surface of materials.

When lines are written on an absorptive writing surface such as paper with an oil based marking pen, the resulting lines have no problem, but when written on a non-absorptive surface, fixability of written lines is different depending on the surface properties of the material. Thus, there is not yet a widely usable oil based marking ink at present.

The above-mentioned problem can be solved to some extent by substituting ethanol for the solvent system. However, when ethanol which has intermediate properties between water and oil is used as a solvent, the resin dissolved in ethanol also exhibits amphoteric behaviors and thereby both water resistance and oil resistance become incomplete.

However, when the condensation product of urea and aliphatic aldehydes of the present invention is contained in the ink composition, the ink composition exhibits good fixability to a polar surface such as a surface of a metal plate as well as a non-polar surface such as a surface of a polypropylene (PP) plate, and further exhibits both excellent water resistance and oil resistance.

The reason for such good results is not clear, but this seems to be attributable to an interaction between the resin molecule and the cationic surface active agent though it is not contemplated that the present invention is limited to a particular mechanism.

In addition, since the ink composition of the present invention uses ethanol as a less toxic and low stimulative solvent, the ink composition substantially does not adversely affect the writing surface of a material such as resins and is substantially safe to man.

The following examples are set forth for purposes of illustration only and are not to be construed as limitations on the present invention.

All parts are by weight unless otherwise specified.

In the following both working examples of the present invention and comparison examples are shown.

EXAMPLE 1

| | |
|---|---|
| Carbon black | 8.0 parts |
| Polyvinylbutyral (S lex B, BM-1, supplied by Sekisui Kagaku K.K.) | 6.0 parts |
| Condensation product of urea and aliphatic aldehydes (Laropal A101, supplied by BASF) | 13.0 parts |
| Perfluoroalkyl quaternary ammonium iodide | 0.2 parts |
| Ethanol | 58.2 parts |
| Isopropyl alcohol | 14.6 parts |

COMPARATIVE EXAMPLE 1

Perfluoroalkyl quaternary ammonium was not added.

| | |
|---|---|
| Carbon black | 8.0 parts |
| Polyvinylbutyral (S lex B, BM-1, supplied by Sekisui Kagaku K.K.) | 6.0 parts |
| Condensation product of urea and aliphatic aldehydes (Laropal A101, supplied by BASF) | 13.0 parts |
| Ethanol | 58.4 parts |
| Isopropyl alcohol | 14.6 parts |

COMPARATIVE EXAMPLE 2

Any condensation product of urea and aliphatic aldehydes as a resin to be added was not incorporated.

| | |
|---|---|
| Carbon black | 8.0 parts |
| Polyvinylbutyral | 6.0 parts |
| Rosin-modified maleic acid resin | 13.0 parts |
| Perfluoroalkyl quaternary ammonium iodide | 0.2 parts |
| Ethanol | 58.2 parts |
| Isopropyl alcohol | 14.6 parts |

EXAMPLE 2

| | |
|---|---|
| Oil blue #613 (trade name, supplied by Orient Kogaku Kogyo K.K.) | 6.0 parts |
| Condensation product of urea and aliphatic aldehydes (Laropal A81, trade name, supplied by BASF) | 10.0 parts |
| Perfluoroalkyl quaternary ammonium iodide | 0.3 parts |
| Ethanol | 80.7 parts |
| Benzyl alcohol | 3.0 parts |

COMPARATIVE EXAMPLE 3

Conventional formula; the resin and solvent are different from those of the present invention and a surface active agent is not added.

| | |
|---|---|
| Oil blue #613 (trade name, supplied by Orient Kogaku Kogyo K.K.) | 6.0 parts |
| Ketone resin | 15.0 parts |
| Xylene | 66.0 parts |
| Ethylcellosolve | 13.0 parts |

The resulting compositions in the Examples and comparative Examples were evaluated with respect to various properties. The results are shown in Table 1.

TABLE 1

|  | Example No. | | Comparative Example No. | | |
| --- | --- | --- | --- | --- | --- |
|  | 1 | 2 | 1 | 2 | 3 |
| Fixability |  |  |  |  |  |
| Metal plate | ◯ | ◯ | ◯ | ∘ | ∘ |
| PP plate | ∘ | ∘ | ∘ | △ | ∘ |
| ABS plate | ∘ | ◯ | ∘ | △ | x |
| Water resistance |  |  |  |  |  |
| Metal plate | ◯ | ◯ | △ | △ | ∘ |
| PP plate | ∘ | ∘ | x | x | ∘ |
| ABS plate | ∘ | ∘ | x | x | x |
| Oil resistance |  |  |  |  |  |
| Metal plate | ◯ | ◯ | △ | △ | x |
| PP plate | ∘ | ∘ | △ | x | x |
| ABS plate | ∘ | ∘ | △ | x | x |
| Smell | ∘ | ∘ | c | ∘ | x |

PP plate: polypropylene plate
ABS plate: Acrylonitrile-butadiene-styrene resin plate
∘: Very good
◯: Good
△: Somewhat poor
x: Poor The evaluation was made by fabricating a marking pen using the ink, drawing lines on each plate, rubbing the lines thus drawn and observing the drawn lines thus rubbed by eyes.

Fixability: After writing, the written lines were dried for one hour and then evaluated.

Water resistance: After writing, the written lines were dried for one hour and allowed to stand in water for 3 days, and then evaluated.

Oil resistance: A machine oil was applied to a surface of a plate and then writing was made on the surface thus coated with the machine oil and the resulting writing was evaluated.

What is claimed is:

1. An alcoholic marking ink composition which comprises a coloring agent, a solvent mainly composed of ethanol, a condensation product of urea and aliphatic aldehydes as a resin to be added, and a cationic surface active agent.

2. The alcoholic marking ink composition according to claim 1 in which the coloring agent is contained in an amount of 0.1–50% by weight based on the total ink composition.

3. The alcoholic marking ink composition according to claim 1 in which the solvent contains at least 80% by weight or more of ethanol.

4. The alcoholic marking ink composition according to claim 1 in which the condensation product of urea and aliphatic aldehydes is contained in an amount of 5–30% by weight based on the total ink composition.

5. The alcoholic marking ink composition according to claim 1 in which the cationic surface active agent is contained in an amount of 0.01–3.0% by weight based on the total ink composition.

6. The alcoholic marking ink composition according to claim 1 in which the total amount of the solvent is 40–95% by weight based on the total ink composition.

* * * * *